(12) United States Patent
Vafin et al.

(10) Patent No.: US 9,166,735 B2
(45) Date of Patent: Oct. 20, 2015

(54) CORRECTION DATA

(75) Inventors: Renat Vafin, Tallinn (EE); Sören Vang Andersen, Esch-sur-Alzette (LU); Mattias Nilsson, Sundbyberg (SE)

(73) Assignee: Skype, Dublin (IE)

( * ) Notice: Subject to any disclaimer, the term of this patent is extended or adjusted under 35 U.S.C. 154(b) by 100 days.

(21) Appl. No.: 13/295,864

(22) Filed: Nov. 14, 2011

(65) Prior Publication Data

US 2013/0019136 A1 Jan. 17, 2013

(30) Foreign Application Priority Data

Jul. 14, 2011 (GB) .................................. 1112110.0

(51) Int. Cl.
*H03M 13/00* (2006.01)
*H04L 1/00* (2006.01)

(52) U.S. Cl.
CPC .............. *H04L 1/0015* (2013.01); *H04L 1/002* (2013.01); *H04L 1/0009* (2013.01)

(58) Field of Classification Search
CPC ..... H04L 1/002; H04L 1/0009; H04L 1/0015; H04L 1/1819; H04L 1/1812; H04L 1/1845; H04L 1/0057; H04L 1/0071; H04L 1/1809; H04L 1/1887; H04L 1/188; H04L 1/0061; H04L 1/0041; H04L 1/0083; H04L 1/0072
See application file for complete search history.

(56) References Cited

U.S. PATENT DOCUMENTS

| | | | |
|---|---|---|---|
| 6,169,728 B1 * | 1/2001 | Perreault et al. | 370/235 |
| 7,447,977 B2 * | 11/2008 | Bauer et al. | 714/774 |
| 7,971,121 B1 * | 6/2011 | Conway | 714/747 |
| 8,300,563 B2 | 10/2012 | Krishnaswamy et al. | |
| 8,340,162 B2 | 12/2012 | Tzannes | |
| 2005/0160346 A1 | 7/2005 | Yamane | |

(Continued)

FOREIGN PATENT DOCUMENTS

| | | |
|---|---|---|
| EP | 0713302 | 5/1996 |
| GB | 2315393 | 1/1998 |
| WO | WO-0072496 | 11/2000 |
| WO | WO-2008021470 | 2/2008 |

OTHER PUBLICATIONS

"Search Report", GB Application No. 1112110.0, (Oct. 31, 2012), 3 pages.

(Continued)

*Primary Examiner* — Albert Decady
*Assistant Examiner* — Enamul M Kabir
(74) *Attorney, Agent, or Firm* — Danielle Johnston-Holmes; Micky Minhas (57) ABSTRACT

Correction data units for data packets of a data stream are generated. A correction data unit is based on a set of the data packets of the stream. The stream is transmitted over a lossy communication channel. A performance measure to be optimized is selected, which relates to the recovery of lost data packets of the stream. A coding requirement is determined. For the generation of the correction data units, it is determined, within the constraints of the coding requirement and based on previously generated correction data units, which of the data packets in the stream to include in the set on which the generation of the correction data unit is to be based to thereby optimize the selected performance measure. A generated correction data unit is generated based on a respective set of the data packets of the stream. The generated correction data units are included in the stream.

20 Claims, 5 Drawing Sheets

(56) References Cited

U.S. PATENT DOCUMENTS

| | | | |
|---|---|---|---|
| 2006/0253763 A1 | 11/2006 | Oliva et al. | |
| 2006/0259627 A1* | 11/2006 | Kellerer et al. | 709/227 |
| 2006/0268933 A1* | 11/2006 | Kellerer et al. | 370/469 |
| 2006/0280205 A1* | 12/2006 | Cho | 370/473 |
| 2007/0022361 A1* | 1/2007 | Bauer et al. | 714/776 |
| 2007/0058669 A1* | 3/2007 | Hoffmann et al. | 370/466 |
| 2010/0017686 A1 | 1/2010 | Luby et al. | |
| 2010/0202309 A1* | 8/2010 | Suneya | 370/252 |
| 2012/0008940 A1 | 1/2012 | de Lind Van Wijngaarden | |
| 2012/0307934 A1* | 12/2012 | Heidari et al. | 375/295 |
| 2013/0100968 A1 | 4/2013 | Vafin et al. | |
| 2014/0047303 A1 | 2/2014 | Vafin | |

OTHER PUBLICATIONS

Dubois-Ferriere, Henri et al., "Packet Combining in Sensor Networks", In Proceedings of the 3rd International Conference on Embedded Networked Sensor Systems, (Nov. 2005), pp. 102-115.

"International Search Report", Mailed Date: Sep. 28, 2012, Application No. PCT/US2012/046822, Filed Date: Jul. 14, 2012, pp. 13.

Frossaro, Pascal, "FEC Performance in Multimedia Streaming", Retrieved at <<http://ieeexplore.ieee.org/stamp/stamp.jsp?tp=&arnumber=913160>>, IEEE Communications Letters, IEEE Service Center, Piscataway, NJ, US, vol. 5, Issue 3, Mar. 1, 2001, pp. 122-124.

\* cited by examiner

CORRECTION DATA

RELATED APPLICATION

This application claims priority under 35 U.S.C. §119 or 365 to Great Britain Application No. GB 1112110.0, filed Jul. 14, 2011. The entire teachings of the above application are incorporated herein by reference.

TECHNICAL FIELD

The present invention relates to correction data. In particular, the present invention relates to generating correction data units relating to a plurality of data packets of a data stream.

BACKGROUND

There are many situations in which a data stream is transmitted from a transmitter to a receiver over a communication channel. A communication channel may exist in one (or more) of many different possible networks. For example, a communication channel may exist in the internet or in a wireless network such as a mobile telecommunications network. The data in a data stream may be divided into data packets for transmission over a communication channel. The protocol for dividing the data into data packets (e.g. the form of the headers of the data packets, and other such implementation details) may depend upon the nature of the communication channel on which the data is to be transmitted, e.g. the type of network through which the data packet is to be transmitted. The data may be encoded by an encoder prior to transmission from the transmitter and decoded by a decoder after reception at the receiver.

In an ideal system, the communication channel is lossless such that every data packet transmitted from the transmitter over the communication channel is received at the receiver. However, in real physical systems, the communication channel may be lossy, meaning that some of the transmitted data packets will be lost on the communication channel and as such will not be received at the receiver. This may be detrimental. Correction schemes can be used to help recover, at the receiver, at least some of the lost data packets.

As an example, forward error correction (FEC) is one correction scheme which can be used to combat packet loss in a communication channel FEC produces redundant data (as FEC data units) in addition to the original data packets and includes the FEC data units in the data stream which is transmitted over the communication channel. The redundant FEC data units may be placed in their own packets, separate to the data packets in the data stream. Alternatively, or additionally, the FEC data units may be appended (or "piggybacked") to the original data packets in the data stream. When some of the original data packets are lost in the communication channel, the successfully arrived FEC data units and the successfully arrived data packets can be used to recover (at least some of) the lost data packets. That is, FEC reduces the packet loss seen by a decoder of the receiver, compared to the actual packet loss in the communication channel.

Figure 1A:
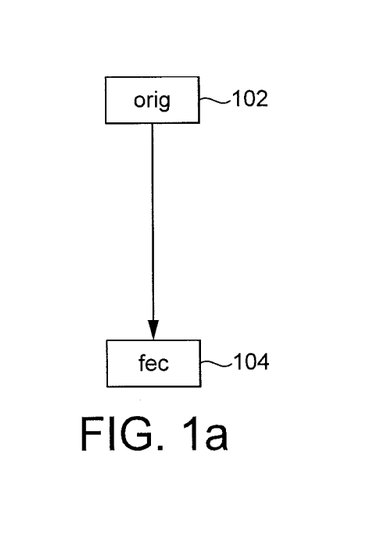
Figure 1B:
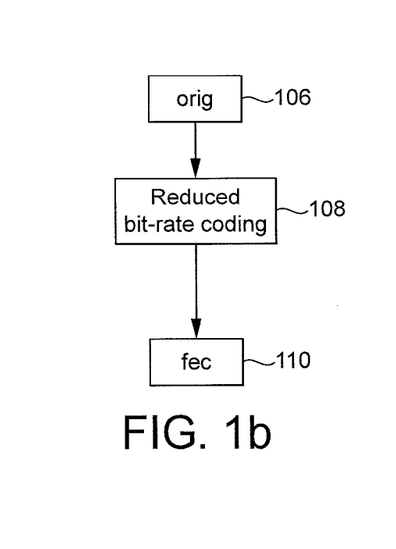
Figure 1C:
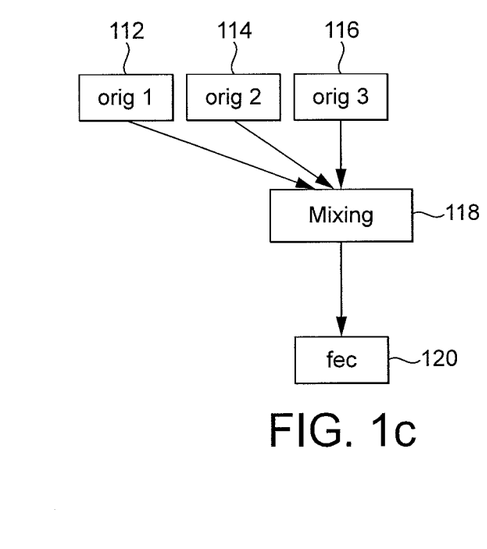

FIGS. 1a, 1b and 1c illustrate three examples of how a FEC data unit may be generated. As illustrated in FIG. 1a, a FEC data unit 104 may be generated as an exact copy of an original data packet 102 of the data stream. By including both the data packet 102 and the FEC data unit 104 in the data stream, the data in the data packet 102 is transmitted twice. Therefore if the data packet 102 is lost during transmission but the FEC data unit 104 is successfully received then the data in the data packet 102 can be successfully recovered at the receiver (using the FEC data unit 104). As illustrated in FIG. 1b a module 108 may be used to generate a FEC data unit 110 which is a copy of an original data packet 106 encoded at a lower bit rate. If the data packet 106 is lost during transmission but the FEC data unit 110 is successfully received then the data in the data packet 106 can be at least partially recovered at the receiver based on the FEC data unit 110. It should be noted that if the data packets 102 and 106 have the same size (e.g. the same number of bits) then the FEC data unit 110 will have a smaller size (e.g. fewer bits) than the FEC data unit 104. Therefore, although the FEC data unit 104 may be more useful in recovering the data packet 102 than the FEC data unit 110 is in recovering the data packet 106, it may be beneficial to generate FEC data units as shown in FIG. 1b since the FEC data unit 110 uses less of the available bit rate on the communication channel for the data stream than the FEC data unit 104 uses. As illustrated in FIG. 1c a mixing module 118 may be used to generate a FEC data unit 120 from a plurality of the original data packets, e.g. data packets 112, 114 and 116. Finite field (Galois field) arithmetic may be used to combine original data packets. For example the mixing module 118 may determine the bit-by-bit result of an XOR function applied to the three data packets 112, 114 and 116 to generate the FEC data unit 120. In another approach, data packets 112, 114 and 116 are combined byte-by-byte using Galois field $GF(2^8)$ arithmetic to generate the FEC data unit 120. In this sense the FEC data unit 120 is the result of combining or mixing the original data packets 112, 114 and 116. If one of the data packets 112, 114 and 116 is lost during transmission but the other two data packets and the FEC data unit 120 are successfully received then the data in the lost data packet can be successfully recovered at the receiver (using the other two data packets and the FEC data unit 120).

It can therefore be seen that FEC data units may be generated in a number of different ways. Different FEC schemes describe different ways in which the FEC data units are to be generated. A FEC scheme may describe factors relating to the generation of the FEC data units, such as: the number of FEC data units that are generated; which data packets are used to generate the FEC data units; how the FEC data units are transmitted (e.g. as separate packets or by appending the FEC data units to the data packets); and where in the data stream the FEC data units are placed. The loss-recovery performance of a FEC scheme describes the ability of the FEC scheme to recover lost data packets at the receiver using the FEC data units.

Generally, increasing the number of FEC data units in the data stream improves the loss-recovery performance of a FEC scheme. However, increasing the number of FEC data units in the data stream comes at a cost of bit rate efficiency. If the coding bit rate of original data packets is kept unchanged, then increased redundancy (e.g. by increasing the number of FEC data units in the data stream) leads to increased total bit rate. Alternatively, if the total bit rate available for the data stream on the communication channel is constrained, then increased redundancy (e.g. by increasing the number of FEC data units in the data stream) comes at a price of reduced coding bit rate of the original data packets. It is therefore an aim to balance the conflicting factors of the loss-recovery performance of the FEC with the bit rate efficiency of the data stream.

One class of algorithm for designing an appropriate FEC scheme is based on error-correcting and erasure codes known from communication theory. One example of such codes is Reed-Solomon codes. The codes are designed according to certain scenarios in which the FEC may operate, to ensure recovery of all lost data packets if the number of lost data packets does not exceed a predetermined maximum.

Another class of algorithm for designing an appropriate FEC scheme is based on training. Training is performed offline. Given channel conditions, and coding requirements for the FEC data units (e.g. (i) the FEC overhead which sets the ratio of redundant data relative to the original data in the data stream, for example the number of FEC data units relative to the number of original data packets in the data stream, and (ii) the FEC depth which sets the maximum allowable displacement in the data stream between the oldest and the newest data packet that can be protected by (or combined into) each FEC data unit), optimal combinations/mixings of the original data packets are trained to optimize for a loss-recovery performance within an optimization window. Since the number of relevant channel conditions, FEC overheads, and FEC depths can be high, the number of trained schemes can be high too.

The classes of algorithm for designing an appropriate FEC scheme described above determine an appropriate FEC scheme for use within an optimization window. That is, a FEC scheme is set for the optimization window with the aim of optimizing the performance of the FEC during the optimization window. The optimization window may be a length of time (e.g. ten seconds) or the optimization window may be a number of data packets of the data stream (e.g. a hundred data packets). At the end of the optimization window, the FEC scheme may be set again for the next optimization window.

SUMMARY

The inventors have realised that it can be beneficial to optimize the correction scheme for each correction data unit that is generated. In this way the correction scheme can be always optimized to the current conditions in which it is operating.

According to a first aspect of the invention there is provided a method of generating correction data units relating to a plurality of data packets of a data stream, each correction data unit being based on a set of the data packets of the data stream, said data stream being for transmission from a transmitter to a receiver over a lossy communication channel, the method comprising: for the generation of each of said correction data units, based on the data stream, selecting a performance measure to be optimized, said performance measure relating to the recovery of lost data packets of the data stream; determining a coding requirement for the generation of each of said correction data units; for the generation of each of said correction data units, determining, within the constraints of said determined coding requirement and based on at least one previously generated correction data unit, which of the data packets of the data stream to include in the set on which the generation of the correction data unit is to be based to thereby optimize the selected performance measure; generating each of said correction data units based on the respective set of the data packets of the data stream; and including the generated correction data units in the data stream.

In preferred embodiments, advantageously, the determination as to which of the data packets to include in the set on which the generation of each correction data unit is to be based is performed on-the-fly, i.e. in real-time for each correction data unit. In other words, the method may dynamically determine which of the data packets of the data stream to include in the set on which the generation of each correction data unit is to be based. This allows the generation of each correction data unit to be optimized based on current conditions. That is, it allows the selected performance measure to be optimized for each correction data unit that is generated. The set of data packets on which the generation of each correction data unit is to be based may include one or more of the data packets of the data stream.

The correction data units may be generated according to any suitable known correction scheme. For example, the correction data units may be generated according to the forward error correction (FEC) scheme. FEC data units may be formed by combining original data packets. For each FEC data unit, the optimal combination of original data packets may be decided on-the-fly. The "combination" may include only one of the data packets, for example when the FEC data units are copies of the data units. The "combination" may include more than one of the data packets. The optimal combination may be decided based on the current channel conditions on the communication channel and based on earlier transmitted FEC data units, so as to optimize the selected performance measure within the constraints of the coding requirement. Generating the FEC data units according to the preferred embodiments described herein provides a high-degree of flexibility towards changing channel conditions, FEC overhead requirements and FEC depth requirements. The preferred embodiments also allow the performance measure to be changed such that the FEC data units can be generated with a view towards optimizing different performance measures as conditions change. The selection of the performance measure to be optimized allows for source-dependent error correction and uneven protection for different types of data in the data stream. Since the selection of the performance measure is performed for the generation of each correction data unit, the performance measure can be changed quickly, thereby allowing a high level of flexibility in the selection of the performance measure.

In preferred embodiments, the generation of each FEC data unit (e.g. the combination of original data packets) is optimized based on current channel conditions and previously generated FEC data units. In preferred embodiments, the choice of each FEC data unit is done 'on-the-fly'. In the preferred embodiments, the generation of each new FEC data unit can be adapted immediately to suit changing channel conditions, FEC overhead and FEC depth requirements, and to suit changes to the performance measure which is to be optimized.

The preferred embodiments advantageously provide greater flexibility in optimizing the generation of the FEC data units compared to the prior art systems described above in which a FEC scheme is set for an optimization window. The preferred embodiments allow the generation of the FEC data units to be optimized for each FEC data unit that is generated. The preferred embodiments can therefore react immediately to changing channel conditions, coding requirements or selected performance measures. The preferred embodiments are therefore particularly useful when the channel conditions, coding requirements or selected performance measures are changing rapidly, since the generation of the FEC data units can be optimized on-the-fly (i.e. in real-time) to immediately react to the changes. In the prior art, the generation of the FEC data units is set for the optimization window, such that the FEC scheme does not react immediately to changes to the channel conditions, coding requirements or selected performance measures occurring within the optimization window.

With the Reed-Solomon codes of the prior art, the optimal codes are defined for a limited number of combinations of FEC overhead and FEC depth requirements, such that there is little flexibility to adapt to changes to these coding requirements beyond the defined combinations. Furthermore, the Reed-Solomon codes provide little flexibility to be extended to source-dependent FEC. With the trained systems of the prior art the optimization window makes it impossible for such methods to adapt quickly to changing channel conditions and FEC overhead and FEC depth requirements. These problems can be overcome with methods described herein.

The method may comprise, for the generation of each of said correction data units, determining current channel conditions on the communication channel, wherein said step of determining which of the data packets of the data stream to include in said set for each of the correction data units is further based on the current channel conditions determined for the generation of that correction data unit. The current channel conditions may comprise at least one of: (i) a current loss probability of data packets transmitted over the communication channel; (ii) a current measure of the loss burstiness of data packets transmitted over the communication channel; (iii) a current congestion on the communication channel; and (iv) the interference experienced on the communication channel. The current channel conditions may be described by a Gilbert model and the method may further comprise: receiving feedback information from the receiver indicating which of the data packets of the data stream have been successfully received; resetting state probabilities of the Gilbert model based on the received feedback information; and propagating the state probabilities in time using the Gilbert model to obtain estimates of the states probabilities at the current time for use in determining the current channel conditions on the communication channel.

The coding requirement may be a current coding requirement for the generation of each of said correction data units. The coding requirement may comprise a depth which sets the maximum allowable displacement in the data stream between the oldest and the newest of the data packets that are allowed to be included within the same one of said sets on which the correction data units are based. The coding requirement may comprise an overhead which sets the ratio between the amount of data in the correction data units included in the data stream and the amount of data in the data packets included in the data stream.

The selected performance measure may comprise at least one of: (i) the number of lost data packets that cannot be recovered; (ii) a sum of non-recovery probabilities of said data packets within an optimization window; (iii) a sum of squared non-recovery probabilities of said data packets within an optimization window; and (iv) a sum of weighted non-recovery probabilities of said data packets within an optimization window, wherein the non-recovery probabilities are weighted to provide different loss sensitivities for different data packets. The selected performance measure may be optimized when it is minimised.

The generated correction data units may be included in the data stream as separate packets to the data packets of the data stream. Alternatively, the step of including the generated correction data units in the data stream may comprise appending the correction data units to at least some of the data packets of the data stream.

In preferred embodiments, the correction data units are forward error correction data units.

According to a second aspect of the invention there is provided apparatus for generating correction data units relating to a plurality of data packets of a data stream, each correction data unit being based on a set of the data packets of the data stream, said data stream being for transmission from a transmitter to a receiver over a lossy communication channel, the apparatus comprising: selection means for selecting, for the generation of each of said correction data units, based on the data stream, a performance measure to be optimized, said performance measure relating to the recovery of lost data packets of the data stream; coding requirement determining means for determining a coding requirement for the generation of each of said correction data units; data packet determining means for determining, for the generation of each of said correction data units, within the constraints of said determined coding requirement and based on at least one previously generated correction data unit, which of the data packets of the data stream to include in the set on which the generation of the correction data unit is to be based to thereby optimize the selected performance measure; generating means for generating each of said correction data units based on the respective set of the data packets of the data stream; and including means for including the generated correction data units in the data stream.

In preferred embodiments, the apparatus further comprises channel condition determining means for determining, for the generation of each of said correction data units, current channel conditions on the communication channel, wherein said data packet determining means is configured to determine which of the data packets of the data stream to include in the set for each of the correction data units based on the current channel conditions determined for the generation of that correction data unit.

According to a third aspect of the invention there is provided a computer program product for generating correction data units relating to a plurality of data packets of a data stream, each correction data unit being based on a set of the data packets of the data stream, said data stream being for transmission from a transmitter to a receiver over a lossy communication channel, and the computer program product being embodied on a non-transient computer-readable medium and configured so as when executed on a processor of the transmitter to perform the methods described herein.

BRIEF DESCRIPTION OF THE DRAWINGS

For a better understanding of the present invention and to show how the same may be put into effect, reference will now be made, by way of example, to the following drawings in which:

FIG. 1$a$ illustrates a first example of how a FEC data unit may be generated;

FIG. 1$b$ illustrates a second example of how a FEC data unit may be generated;

FIG. 1$c$ illustrates a third example of how a FEC data unit may be generated;

DETAILED DESCRIPTION

Preferred embodiments of the invention will now be described by way of example only.

Figure 2:
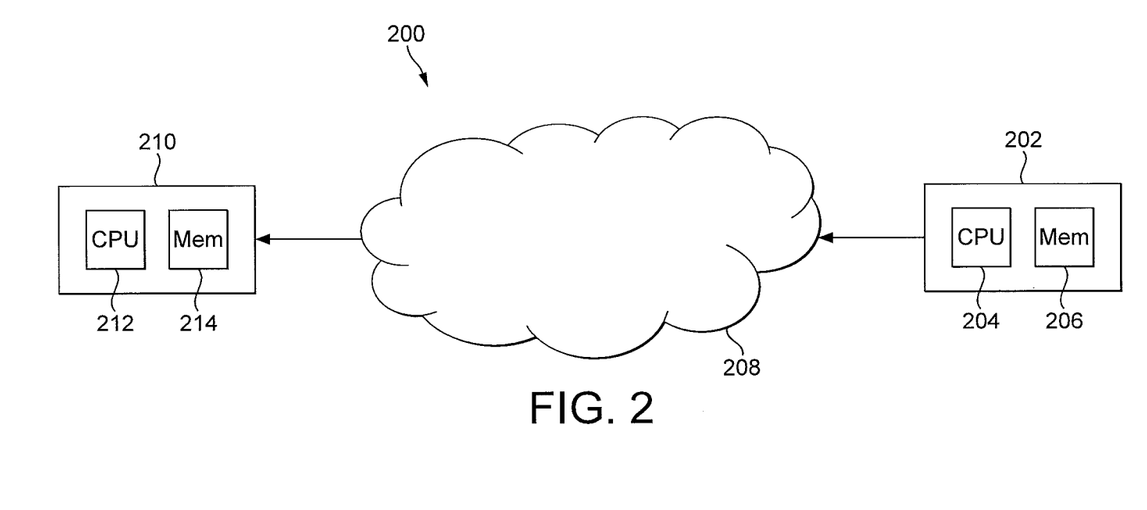
FIG. 2 shows a communication system according to a preferred embodiment.

With reference to FIG. 2 there is now described a communication system 200 according to a preferred embodiment. The communication system 200 comprises a transmitter 202, a network 208 and a receiver 210. The transmitter 202 comprises a processor 204 for processing data and a memory 206 for storing data. Similarly, the receiver 210 comprises a processor 212 for processing data and a memory 214 for storing data.

In operation the transmitter can process data (e.g. retrieved from the memory 206) to form a data stream comprising a plurality of data packets (e.g. using the processor 204). This processing may involve encoding the data for transmission according to any known protocol. Methods for encoding and packetizing data into a data stream are known in the art, and as such are not described in detail herein. The data stream can then be transmitted over a communication channel through the network 208 to the receiver 210. Methods for transmitting a data stream over a communication channel through a network are known in the art, and as such are not described in detail herein. The receiver 210 can then process the received data packets (e.g. using the processor 212) to retrieve the data. This processing may involve depacketising and decoding the data from the data stream. The data may be stored in the memory 214 at the receiver, or output from the receiver 210, e.g. to a user. The data in the data stream may relate to a real-time communication event (such as a voice call or a video call) between a user of the transmitter 202 and a user of the receiver 210. Alternatively, the data in the data stream may relate to a data transfer such as a file transfer between the transmitter 202 and the receiver 210. The data in the data stream may be any other suitable type of data.

The network 208 may be any suitable network which has the ability to provide a communication channel between the transmitter 202 and the receiver 210. The network 208 could be a Wide Area Network (WAN) or a Local Area Network (LAN). As examples, the network 208 may be an intranet, the internet or a telephony network such as a mobile telephone network. The transmitter 202 and receiver 210 may be implemented in any suitable apparatus or device for transmitting and receiving a data stream over the network 208 respectively. For example, the transmitter 202 and receiver 210 may be implemented as user devices such as personal computers or telephones which have the ability to connect to the network 208, or as other devices such as server nodes in a network.

Figure 3:
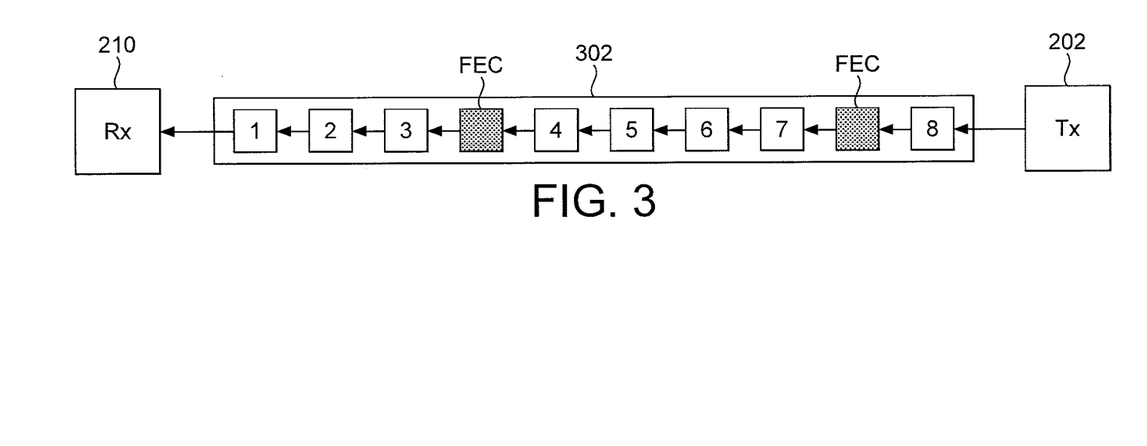
FIG. 3 is a representation of a data stream being transmitted in a communication system according to a preferred embodiment.

FIG. 3 shows a representation of a data stream 302 being transmitted in the communication system 200 from the transmitter 202 to the receiver 210. The data stream 302 includes eight data packets labelled 1 to 8 in FIG. 3. Only eight data packets are shown in FIG. 3 for clarity but the data stream may include many more than eight data packets. As shown in FIG. 3, the data stream also includes FEC data units (labelled "FEC"). In FIG. 3 the FEC data units are shown as separate packets to the data packets in the data stream. However, the FEC data units may be appended (or "piggybacked") to the data packets. When the FEC data units are appended to the data packets the FEC data units do not require their own packet formatting, such as packet headers, and as such the amount of data in the data stream required for the FEC data units may be slightly reduced. However, appending the FEC data units to the data packets means that if a data packet is lost then so is the FEC data unit appended to that lost data packet. A FEC data unit appended to a data packet protects other data packets than the data packet to which it is appended.

As described above (e.g. in relation to FIGS. 1a to 1c), the FEC data units are generated based on a set of the data packets of the data stream. The set may include one or more data packet. A FEC data unit may, for example, be an exact copy of an original data packet (as illustrated in FIG. 1a), or a copy of an original data packet encoded at a lower bit rate (as illustrated in FIG. 1b), or a combination/mixing of original data packets (as illustrated in FIG. 1c). Finite field (Galois field) arithmetic may be used to combine original data packets. In one approach, data packets are combined bit-by-bit using a bitwise XOR operation defined as (0 XOR 0)=(1 XOR 1)=0 and (0 XOR 1)=(1 XOR 0)=1. In another approach, data packets are combined byte-by-byte using Galois field $GF(2^8)$ arithmetic. This way, FEC data units may be generated by combining two or more of the data packets.

The communication channel through the network 208 is lossy, meaning that some of the data packets in the data stream will be lost during transmission from the transmitter 202 to the receiver 210. The FEC data units can be used at the receiver 210 to recover data packets which are lost during transmission. The term "lost data packets" includes data packets which are corrupted beyond repair during transmission as well as data packets which are lost during transmission.

As described above the scheme for generating the FEC data units sets the number of FEC data units to be generated and determines which of the data packets to use when generating the FEC data units. The loss-recovery performance of a FEC scheme describes the extent to which lost data packets can be recovered at the receiver using the FEC data units. The loss-recovery performance of a FEC scheme largely depends on the FEC overhead and FEC depth used in the FEC scheme.

FEC overhead describes the amount of redundant data relative to the amount of original data (e.g., the number of FEC packets relative to the number of original packets). Higher overhead generally improves the loss-recovery performance of a FEC scheme. On the other hand, higher overhead comes at a cost of bit rate efficiency. If the coding bit rate of original data is kept unchanged, then increased redundancy leads to increased total bit rate. Alternatively, if the total bit rate is constrained, then increased redundancy comes at a price of reduced coding bit rate of original data. As an example, for the FEC scheme which was used to generate the data stream 302 shown in FIG. 3, the FEC overhead was 25%. That is because there are eight data packets and two FEC packets. For this calculation, it is assumed that the amount of data in the FEC packets is the same as that in the data packets themselves.

FEC depth describes the displacement between the oldest and the newest of the data packets (including both of those data packets) that can be protected by (i.e. combined into) a FEC data unit. In other words, it describes the maximum number of original data packets that can be combined into a FEC data unit. Higher depth provides more possibilities of different combinations of data packets for the FEC data units, thus achieving higher flexibility of a FEC scheme, for example, to varying channel conditions. In one extreme example, where a FEC data unit is constrained to be a copy of one original data packet, higher depth provides a possibility for larger separation of the original data packet and its copy (the FEC data unit) in time. This is advantageous in bursty packet-loss conditions, since it minimizes the probability of both the original data packet and the copy (the FEC data unit) being lost in a burst on the communication channel. As an example, if the FEC depth of the FEC scheme used to generate the data stream 302 shown in FIG. 3 is five then the FEC packet shown between data packets 7 and 8 could be based on any one or more of the data packets labelled 3, 4, 5, 6 and 7.

Figure 4:
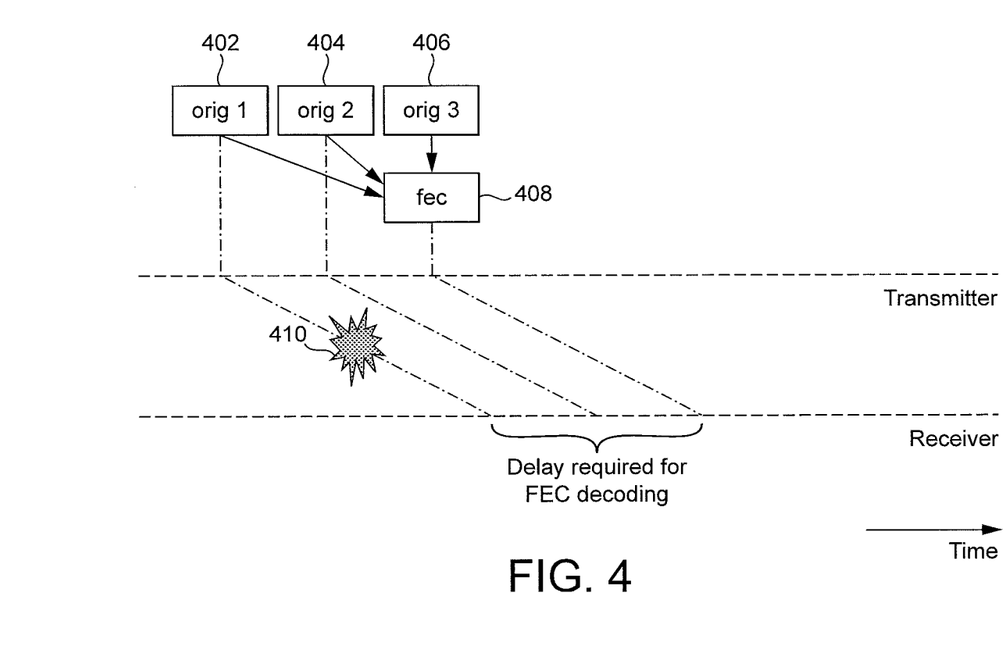
FIG. 4 is a timing diagram showing the transmission of data packets in a communication system according to a preferred embodiment.

The FEC depth is related to delay in the transmission. A FEC data unit combines previously-generated original data packets, and therefore there is no additional algorithmic delay at the transmitter 202 caused by using FEC. However, in order to reconstruct a lost data packet at the receiver 210, we assume a delay at the receiver 210, since the FEC data unit is generated and transmitted later than the data packets on which it is based. This can be seen in the timing diagram shown in FIG. 4. FIG. 4 shows a situation in which three of the data packets (402, 404 and 406) of the data stream are used to generate the FEC data unit 408. The FEC data unit cannot be generated until all three of the data packets 402, 404 and 406 have been generated. Therefore, the data packets 402 and 404 will be transmitted from the transmitter 202 before the FEC data unit 408 is generated at the transmitter 202. Therefore, the earliest that the FEC data unit 408 can be transmitted is straight after the data packet 406. This scenario is shown in FIG. 4. The transmission of the data packets and the FEC data unit takes some finite amount of time. FIG. 4 depicts the loss (410) of the data packet 402 during the transmission over the lossy communication channel through the network 208. However, the data packets 404 and 406 and the FEC data unit 408 are all successfully received at the receiver 210. The data packets 404 and 406 and the FEC data unit 408 can be used to recover the lost data packet 402 at the receiver 210. However, the lost data packet 402 cannot be recovered until all three of: the data packets 404 and 406 and FEC data unit 408 have been received at the receiver 210. Therefore, as shown in FIG. 4, there is a delay required for FEC recovery of the data packet 402 between the time when the data packet 402 should have been received at the receiver 210 (if it had not been lost) and the time at which the data packet can be recovered using the FEC data unit 408. This delay may be detrimental if the data in the data stream is to be output from the receiver 210 in real-time as it is received, e.g. in a voice call or a video call. In other embodiments, e.g. when the data is to be stored in the memory 214 at the receiver 210, for example, when the data stream relates to a file transfer between the transmitter 202 and the receiver 210, then the delay may not be so detrimental. Therefore, different types of data stream may have different delay requirements, which define the maximum delay that is acceptable before recovering a lost data packet. If the delay requirement for the data stream is not satisfied, the lost data packet 402 will be declared as not decodable at the receiver 210 prior to the arrival of the FEC data unit 408. This will most likely cause the performance of the FEC scheme to drop significantly.

However, this delay need not be necessarily introduced at the receiver by FEC as an additional delay. For example, the required delay may already exist at the receiver 210. One possible cause of delay at the receiver 210 is the presence of a jitter buffer. A jitter buffer introduces a delay into the data stream in order to mitigate random variations in packet arrival times (jitter). If the FEC data unit 408 is received before the time at which the data packet 402 was due to be output from the jitter buffer (had it not been lost during transmission) then it may be possible to recover the data packet 402 without introducing any extra delay at the receiver 210 over and above the delay already introduced by the jitter buffer. The FEC depth should be chosen so as to keep the delay between a lost data packet and a FEC data unit which can be used to recover the lost data packet within the delay requirements at the receiver 210. Therefore, for real-time data transmission (e.g. video call or audio call) the FEC depth may be set to a relatively low number, whereas for a data transfer such as a file transfer between the transmitter 202 and the receiver 210 the FEC depth may be set to a relatively high number to better cope with bursty loss conditions on the communication channel.

Figure 5:
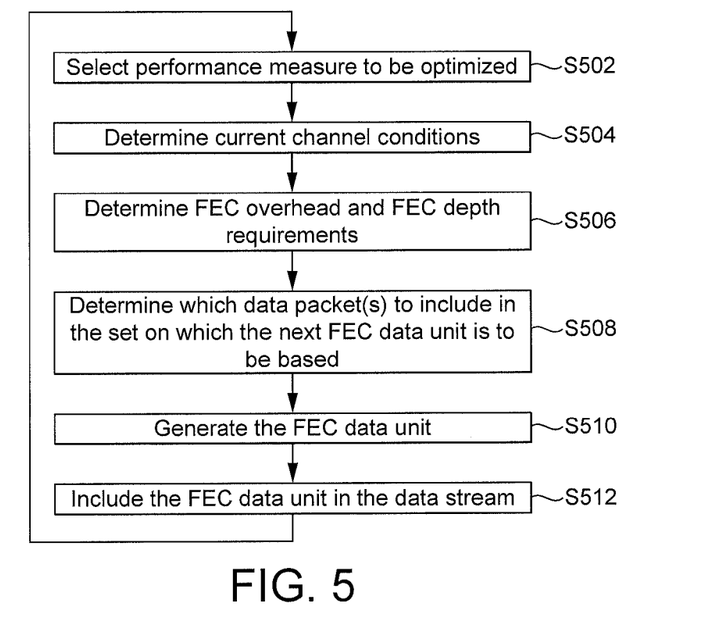
FIG. 5 is a flow chart for a process of generating correction data units according to a preferred embodiment.
Figure 6:
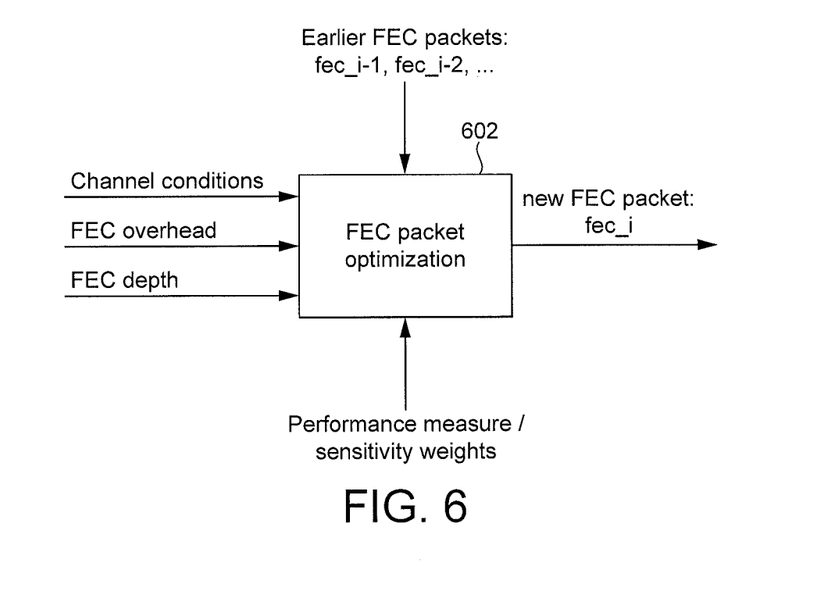
FIG. 6 is a schematic diagram showing a functional module for generating correction data units according to a preferred embodiment.

With reference to FIGS. 5 and 6 there is now described a method of generating the FEC data units according to a preferred embodiment.

In step S502 a performance measure is selected to be optimized. The performance measure is a measure of the loss-recovery performance of the FEC scheme. Examples of loss-recovery performance measures are:
  (i) the number of losses that can be recovered;
  (ii) the sum $\Sigma p_i$, where $p_i$ is the non-recovery probability of the ith data packet. The sum includes original data packets within an optimization window;
  (iii) the sum $\Sigma(p_i)^2$. Again, the sum includes original data packets within an optimization window. Squaring the non-recovery probabilities punishes higher non-recovery probabilities (i.e. outliers) more heavily; and
  (iv) the sum $\Sigma w_i p_i$, where $w_i$ is a weight applied to the non-recovery probability of the ith data packet. The weights describe different levels of importance or sensitivity to loss of different data packets. Again, the sum includes original data packets within an optimization window. FEC schemes that use such a weighted performance measure are referred to as source-dependent FEC or uneven-error-protection FEC, because the protection provided to different data packets is different. This allows a greater level of protection to be provided for more important data packets of the data stream (e.g. data packets from a particular application or user or data packets having greater importance, e.g. different audio data packets and different video data packets may have different levels of protection provided to them by the FEC scheme). In this way the data packets can have different levels of priority in the FEC scheme.

The optimization window may be a length of time or a number of data packets in the data stream over which the sums described above are calculated.

In step S504 the current conditions on the communication channel are determined. This step could comprise determining one or more of: (i) a current loss probability of data packets transmitted over the communication channel; (ii) a current measure of the loss burstiness of data packets transmitted over the communication channel; (iii) a current congestion on the communication channel; and (iv) the interference experienced on the communication channel. The most suitable FEC scheme depends upon the current channel conditions of the communication channel.

In step S506 the FEC overhead and the FEC depth requirements are determined. As described above, these coding requirements for the generation of the FEC data units are determined according to the desired attributes of the FEC scheme. For example, if the data stream is a real-time communication data stream the FEC depth is reduced relative to when the data stream is a file transfer. As another example, the FEC overhead may be reduced if the bit rate efficiency of the data stream is more important than the loss-recovery performance of the FEC scheme.

The selection of the performance measure in step S502 is used to determine which channel conditions are to be determined in step S504 (e.g. the conditions which are required to calculate the selected performance measure are determined). With knowledge of the performance measure selected in step S502 and the channel conditions determined in step S504, the FEC overhead and FEC depth can be determined in step S506 accordingly.

In step S508 it is determined which of the data packets of the data stream to include in the set of data packets on which the next FEC data unit is to be based. This step takes into account the determined current channel conditions (from step S504), the determined coding requirements, e.g. the FEC overhead and FEC depth requirements (from step S506), and the selection of the performance measure to be optimized (from step S502). The determination in step S508 ensures that the FEC data units are generated within constraints of the coding requirements of the FEC scheme. The determination in step S508 takes account of the current channel conditions in order to optimize the performance measure which was selected in step S502. Where the selected performance measure is one of those marked above as (ii), (iii) or (iv), optimizing the performance measure may involve minimising the result of the respective sum. In this way the non-recovery probability sum that has been selected is minimized. If the selected performance measure is that marked (i) above then optimizing the performance measure may involve maximising the number of losses that can be recovered. In optimizing the performance measure the step S508 also takes account of earlier FEC data units which have been generated and included in the data stream. By considering previously generated FEC units, the step S508 can determine the optimum gap between FEC data units and can also ensure that between the plurality of FEC data units which are generated a satisfactory protection (against loss) is provided to all of the data packets of the data stream. Some of the data packets may be protected by more than one FEC data unit. This means that the portions of the data stream covered by different FEC data units may overlap. In this way, FEC data units are selected for generation accounting for previously generated FEC data units that potentially already protect some of the data packets of the data stream to different degrees.

In step S510 the FEC data unit is generated based on the set of data packets that has been determined in step S508. In this way the generation of the FEC data unit is performed so as to optimize the performance measure selected in step S502 within the coding requirements determined in step S506.

Steps S508 and S510 are performed by the module 602 shown in FIG. 6. The module 602 may be a software module which is executed by the processor 204 at the transmitter 202. Alternatively, the module 602 may be a hardware module implemented at the transmitter 202. As illustrated in FIG. 6, the module 602 receives, as inputs, the channel conditions, the FEC overhead requirement, the FEC depth requirement, the selected performance measure and an indication of earlier FEC data units which have been generated. Based on these inputs, the module 602 generates the next FEC data unit and outputs the FEC data unit for inclusion in the data stream.

In step S512 the FEC data unit which is generated in step S510 is included in the data stream for transmission over the communication channel from the transmitter 202 to the receiver 210. As described above, the FEC data unit may be included as a separate packet in the data stream, or may be appended, or "piggybacked", to one of the data packets in the data stream. The data stream, including the FEC data unit is transmitted from the transmitter 202 to the receiver 210 over the communication channel. The data stream can be transmitted whilst the steps of the method shown in FIG. 5 are being performed for the next FEC data unit.

The method steps S502 to S512 shown in FIG. 5 are repeated for each FEC data unit. By performing the steps for each FEC data unit the generation of the FEC data units is adapted immediately to changing conditions, such as changing channel conditions on the communication channel, changing coding requirements and changes to the performance measure which is to be optimized. In this way the generation of the FEC data units can be adapted on-the-fly, i.e. dynamically adapted in real-time.

It can therefore be understood that for given channel conditions, FEC overhead, and FEC depth, the selection of optimal combinations/mixings of original data packets to form the FEC data units can be driven by optimizing the selected loss-recovery performance measure. Each FEC data unit is generated with a view to optimizing the performance measure based on the current channel conditions, FEC overhead and FEC depth, given the earlier FEC data units. That is, it is taken into account that some of the original data packets that can be protected by the new FEC data unit may have already been protected to a certain degree by earlier FEC data units. As described above, the new FEC data unit may be generated to thereby minimize one of the performance measures $\Sigma p_i$, $\Sigma(p_i)^2$ or $\Sigma w_i p_i$, where the non-recovery probabilities account for channel conditions, earlier FEC packets, and different candidate options for the new FEC packet.

By taking account of previous FEC data units, the level to which each data packet is already protected by previous FEC data units can be used to determine how to generate the next FEC data unit. In this way, the generation of the FEC data units can be controlled for each FEC data unit on-the-fly, but can also make sure that the group of generated FEC data units as a whole provide sufficient protection to all of the data packets of the data stream. As an example, if one of the data packets in the data stream is already protected by one or more previously generated FEC data units, then it may be determined that the next FEC data unit is not required to provide protection for that data packet. However, if for example, the current channel conditions are poor (e.g. there is a high packet loss on the communication channel) it may be determined that the next FEC data unit should protect a data packet even if that data packet has already been protected by a previously generated FEC data unit. These decisions can be made in real-time, on-the-fly, as each FEC data unit is generated. This allows the generation of the FEC data units to be optimized for each FEC data unit that is generated based on the previously generated FEC data units.

Optimization for each FEC data unit is performed on-the-fly. While providing a good performance, the proposed method offers high degree of flexibility to:
 changing channel conditions;
 changing FEC overhead requirements;
 changing FEC depth requirements; and
 changing distortion measures (e.g., changing sensitivity weights in source-dependent FEC)

Figure 7:
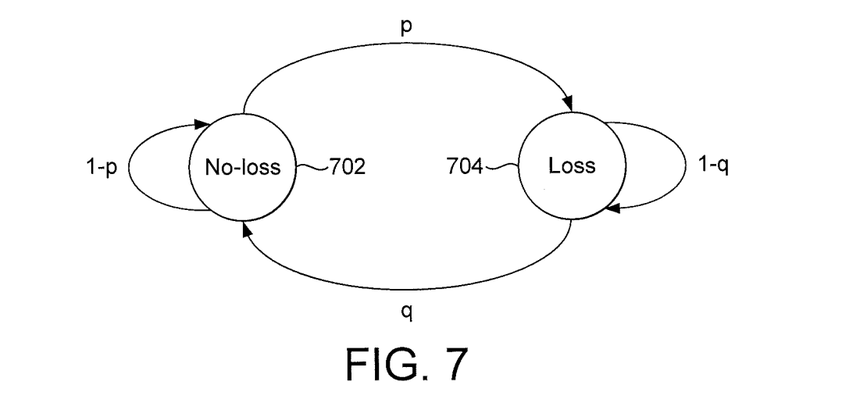
FIG. 7 is a schematic diagram representing a Gilbert model.

In one example, the channel conditions are described by a model. In one example, the model is a Gilbert model, as illustrated in FIG. 7. A Gilbert model is described by two states (packet loss 704 and no-loss 702) and by transition probabilities between the states defined by parameters p and q as shown in FIG. 7. The parameters p and q may be taken into account when determining how to optimize the FEC scheme. When packet loss is high on the communication channel (e.g. when p>q) then a greater number of FEC data units may be desirable to thereby maintain the loss-recovery performance at an acceptable level. In contrast, when packet loss is low on the communication channel (e.g. when p<q) then a lower number of FEC data units may be desirable to thereby improve the bit rate efficiency of the data stream.

In some embodiments the state-probabilities in the Gilbert model may be reset based on feedback information from the receiver 210. Feedback information in this context may indicate that a particular data packet has been successfully received or may indicate that the particular data packet was lost during transmission (or received too late to be considered as received successfully). The feedback information is transmitted from the receiver 210 to the transmitter 202 and as such the feedback information is available at the transmitter 202 after a time delay of approximately one Round Trip Time (RTT) on the communication channel. Therefore the feedback information received at the transmitter 202 relates to a point in the data stream that is approximately one RTT delayed compared to the current point in the data stream that the transmitter 202 is currently processing. Therefore, the Gilbert model is used, whereby the state probabilities are reset (i.e., the probability of one state is set to 0 and the other to 1 depending on the indication in the feedback information) for a time point t-RTT where t is the current point in time. The Gilbert model is then used to propagate the state probabilities from the time point t-RTT to the current time point t, in order to obtain a current estimate of the state probabilities (at time t). The estimated state probabilities at time t can be used in determining the current channel conditions on the communication channel, which in turn can be used in the generation of the FEC data units as described above.

In one example, more than one FEC data unit may be designed at a time. In this case, a small number of FEC packets are optimized jointly. This example acts as a trade-off between on-the-fly determination of the FEC data units and setting the FEC scheme for a plurality of FEC data units simultaneously. Instead of taking a decision for the generation of a FEC data unit when it is due to be generated, the method may wait until it is time to generate the next FEC data unit, and then optimize the two data units jointly at the same time, while taking into account all of the previous FEC data units that protect data packets that can be protected by these two FEC data units. Waiting before generating a FEC data unit in this way may improve the recovery performance of the FEC scheme as the generation of the FEC data units can take into account more information. However, waiting in this way increases the delay in generating the FEC data units. Therefore the decision as to whether to wait before generating a FEC data unit as described above is a trade-off between the delay and the improved recovery performance. This decision can be made on-the-fly. In this sense, a common performance measure is selected for the generation of a plurality of the FEC data units and a common coding requirement is determined for the generation of the plurality of FEC data units. Then for the generation of the plurality of FEC data units, it is determined jointly which of the data packets of the data stream to include in the respective sets on which the generation of each of the plurality of FEC data units is to be based to thereby optimize the selected common performance measure within the constraints of the determined common coding requirement and based on at least one previously generated FEC data unit.

In the preferred embodiments described above, the correction scheme that is used is a FEC scheme. In other embodiments, other types of correction scheme may be used which generate correction data units which are not FEC data units.

A FEC scheme that transmits all of the original data and the redundant FEC data is called a systematic FEC scheme. A FEC scheme that does not transmit all of the original data is called a non-systematic scheme. In the latter case, the total amount of data in the transmitted data stream is still higher than the amount of original data in the data stream (prior to the generation of the FEC data), to thereby provide redundancy. For simplicity, but without loss of generality, the embodiments described herein relate to systematic FEC schemes, but it would be apparent to a person skilled in the art that the same principles could be applied to non-systematic schemes.

The method steps shown in FIG. 5 and described herein may be implemented in hardware or in software at the transmitter 202. Furthermore, there may be provided a computer program product (e.g. for storage in the memory 206 of the transmitter 202) comprising instructions which when executed by computer processing means at the transmitter 202 will implement the methods described above. In particular, the processor 204 could implement each step in FIG. 5 at the transmitter 202.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

Furthermore, while this invention has been particularly shown and described with reference to preferred embodiments, it will be understood to those skilled in the art that various changes in form and detail may be made without departing from the scope of the invention as defined by the appendant claims.

What is claimed is:

1. A method comprising:
generating a plurality of correction data units relating to a plurality of data packets of a data stream, each correction data unit of the plurality of correction data units being based on a respective set of data packets associated with the data stream, the generation of each correction data unit of the plurality of correction data units comprising, for each correction data unit, performing the method of:
selecting a respective performance measure associated with a respective correction data unit to be optimized, said respective performance measure associated with a recovery of lost data packets of the data stream;
determining a respective coding requirement for the respective correction data unit;
determining, within the constraints of said determined respective coding requirement and based on at least one previously generated correction data unit, which of the data packets of the data stream to include in the respective set of data packets on which the generation of the respective correction data unit is to be based to thereby optimize the selected performance measure, the determining which of the data packets to include comprising:
determining whether at least one data packet used to generate the at least one previously generated correction data unit has a loss-protection priority associated with using multiple correction data units for loss protection of the at least one data packet; and
responsive to determining the at least one data packet has the loss-protection priority associated with using multiple correction data units, determining whether to include the at least one data packet in the respective set of data packets on which the generation of the respective correction data unit is to be based;

generating the respective correction data unit based on the respective set of the data packets of the data stream; and including the generated respective correction data unit in the data stream.

2. The method of claim 1, the generation of each respective correction data unit of the plurality of correction data units further comprising:

determining current channel conditions on a communication channel associated with the data stream, wherein determining which of the data packets of the data stream to include in said set of data packets for said correction data unit, based, at least in part, on the determined current channel conditions associated with the respective correction data unit.

3. The method of claim 2 wherein the current channel conditions comprise at least one of:

a current loss probability of data packets transmitted over the communication channel;

a current measure of the loss burstiness of data packets transmitted over the communication channel;

a current congestion on the communication channel; and the interference experienced on the communication channel.

4. The method of claim 2 wherein the current channel conditions are described by a Gilbert model.

5. The method of claim 4 further comprising:

receiving feedback information, from a receiver associated with the communication channel, indicating which of the data packets of the data stream have been successfully received by the receiver;

resetting state probabilities of the Gilbert model based on the received feedback information; and propagating the state probabilities in time using the Gilbert model to obtain estimates of the states probabilities at a current time for use in determining the current channel conditions on the communication channel associated with the respective correction data unit.

6. The method of claim 1 wherein said coding requirement is a current coding requirement for the generation of each of the respective correction data units.

7. The method of claim 1 wherein the coding requirement comprises a depth which sets a maximum allowable displacement in the data stream between an oldest and a newest of the data packets that are allowed to be included within the respective set of data packets on which the respective correction data unit is based.

8. The method of claim 1 wherein the coding requirement comprises an overhead which sets a ratio between an amount of data in the respective correction data unit included in the data stream and an amount of data in the data packets included in the data stream.

9. The method of claim 1 wherein the selected performance measure comprises at least one of:

a number of lost data packets that cannot be recovered;

a sum of non-recovery probabilities of said data packets within an optimization window;

a sum of squared non-recovery probabilities of said data packets within an optimization window; and a sum of weighted non-recovery probabilities of said data packets within an optimization window, wherein the non-recovery probabilities are weighted to provide different loss sensitivities for different data packets.

10. The method of claim 9 wherein the selected performance measure is optimized when it is minimised.

11. The method of claim 1 wherein the generated respective correction data units are included in the data stream as separate packets to the data packets of the data stream.

12. The method of claim 1 wherein including the generated respective correction data units in the data stream comprises appending the correction data units to at least some of the data packets of the data stream.

13. The method of claim 1 wherein the generated respective correction data units are forward error correction data units.

14. The method of claim 1 further comprising:

selecting a common performance measure for the generation of the plurality of correction data units;

determining a common coding requirement for the generation of the plurality of correction data units; and determining jointly, for the generation of each respective correction data unit of the plurality of correction data units, which of the data packets of the data stream to include in the respective set of data packets based on:

optimizing the selected common performance measure within constraints associated with the determined common coding requirement; and at least one previously generated correction data unit.

15. An apparatus comprising:

at least one processor; and one or more computer-readable memory storage devices comprising processor-executable instructions which, responsive to execution by the at least one processor, are configured to enable the apparatus to perform operations comprising:

generating correction data units associated with a plurality of data packets of a data stream, each correction data unit based, at least in part, on a respective set of data packets of the data stream, the processor-executable instructions to generate the correction data units further configured, for the generation of each respective correction data unit, to perform operations comprising:

selecting a respective performance measure to be optimized for said respective correction data unit, said respective performance measure associated with recovering lost data packets of the data stream;

determining a respective coding requirement associated with said respective correction data unit;

determining, within the constraints of said determined respective coding requirement and based on at least one previously generated correction data unit, which of the data packets of the data stream to include in the respective set of data packets on which the generation of said respective correction data unit is to be based to thereby optimize the selected respective performance measure, the determining which of the data packets to include comprising:

determining whether at least one data packet used to generate the at least one previously generated correction data unit has a loss-protection priority associated with using multiple correction data units for loss protection of the at least one data packet;

determining a level of protection provided by the at least one previously generated correction data unit to the at least one data packet; and determining whether to include the at least one data packet in the respective set of data packets on which the generation of the respective correction data unit is to be based, the determining based, at least in part, on the loss-protection priority of the at least one data packet and the level of protection provided by the at least one previously generated correction data unit;
generating said respective correction data unit based on the respective set of the data packets of the data stream; and
including said respective generated correction data unit in the data stream,
wherein the apparatus is further configured to optimize different performance measures associated with different correction data units.

16. The apparatus of claim 15, the processor-executable instructions further configured to perform operations comprising:
determining, for the generation of each said respective correction data unit, current channel conditions on a communication channel associated with transmission of the data stream, wherein the apparatus is further configured to determine which of the data packets of the data stream to include in the respective set of data packets for said respective correction data unit based on the current channel conditions determined for the generation of said respective correction data unit.

17. One or more computer-readable hardware storage memory devices comprising processor-executable instructions which, responsive to execution by at least one processor, are configured to perform operations comprising:
generating a plurality of error correction data units associated with a plurality of data packets of a data stream, the generation of each respective correction data unit based, at least in part, on a respective set of data packets of the plurality of data packets, the instructions to generate the plurality of error correction data units further configured, for the generation of each respective correction data unit, to perform operations comprising:
selecting a respective performance measure associated with the respective correction data unit, relating to a recovery of lost data packets of the data stream, to be optimized from a group of performance measures;
determining a respective coding requirement;
determining, within the constraints of said respective determined coding requirement associated with the respective correction data unit and based on at least one previously generated correction data unit, which of the data packets of the data stream to include in the respective set of data packets to thereby optimize the selected respective performance measure, the determining which of the data packets to include comprising:
determining whether at least one data packet used to generate the at least one previously generated correction data unit has a loss-protection priority associated with using multiple correction data units for loss protection of the at least one data packet;
determining a level of protection provided by the at least one previously generated correction data unit to the at least one data packet; and
determining whether to include the at least one data packet in the respective set of data packets on which the generation of the respective correction data unit is to be based, the determining based, at least in part, on the loss-protection priority of the at least one data packet and the level of protection provided by the at least one previously generated correction data unit;
generating the respective correction data unit based on the respective set of the data packets of the data stream; and
including the generated respective correction data unit in the data stream.

18. An apparatus comprising:
a generating block configured to generate a plurality of correction data units associated with a plurality of data packets of a data stream, each correction data unit of the plurality of correction data units based, at least in part, on a respective set of data packets of the plurality of data packets;
a selection block configured to select separately, for the generation of each respective correction data unit of the plurality of correction data units, a respective performance measure associated with a respective correction data unit, from a plurality of performance measures, to be optimized, said respective performance measure associated with a recovery of lost data packets of the data stream;
a coding requirement determining block configured to determine a respective coding requirement for the respective correction data unit, during the generation of each correction data unit;
a data packet determining block configured to determine, for the generation of each respective correction data unit, within the constraints of said determined respective coding requirement and based on at least one previously generated correction data unit, which of the data packets of the data stream to include in the respective set of data packets on which the generation of the respective correction data unit is to be based to thereby optimize the selected respective performance measure, the data packet determining block further configured to:
determine a loss-protection priority of at least one data packet used to generate the at least one previously generated correction data unit; and
responsive to determining the loss-protection priority of the at least one data packet, determine, based at least in part on the loss-protection priority, whether to include the at least one data packet in the respective set of data packets on which the generation of the respective correction data unit is to be based; and
an including block configured to include each said generated respective correction data unit in the data stream.

19. The one or more computer-readable hardware storage memory devices of claim 17, wherein the processor-executable instructions are further configured to perform operations comprising:
determining current channel conditions on a communication channel associated with transmission of the data stream; and
selecting the respective performance measure from the group of performance measures based, at least in part, on the determined channel conditions.

20. The one or more computer-readable hardware storage memory devices of claim 17, wherein selecting the respective performance measure associated with the respective correction data unit further comprises selecting at least one different performance measure for different correction data units.

* * * * *